United States Patent
Aoyama et al.

(10) Patent No.: US 10,071,737 B2
(45) Date of Patent: Sep. 11, 2018

(54) VEHICLE CONTROL APPARATUS

(71) Applicant: JATCO Ltd, Fuji-shi, Shizuoka (JP)

(72) Inventors: Noritaka Aoyama, Okazaki (JP); Azusa Shimoda, Okazaki (JP); Yuki Ono, Okazaki (JP); Tomoaki Kabe, Nagoya (JP)

(73) Assignee: JATCO Ltd, Fuji-Shi (JP)

( * ) Notice: Subject to any disclaimer, the term of this patent is extended or adjusted under 35 U.S.C. 154(b) by 224 days.

(21) Appl. No.: 15/114,463

(22) PCT Filed: Jan. 29, 2015

(86) PCT No.: PCT/JP2015/052448
§ 371 (c)(1),
(2) Date: Jul. 27, 2016

(87) PCT Pub. No.: WO2015/115518
PCT Pub. Date: Aug. 6, 2015

(65) Prior Publication Data
US 2016/0339918 A1 Nov. 24, 2016

(30) Foreign Application Priority Data
Jan. 30, 2014 (JP) .................................. 2014-016058

(51) Int. Cl.
*B60W 10/02* (2006.01)
*B60W 30/18* (2012.01)
(Continued)

(52) U.S. Cl.
CPC ....... *B60W 30/18018* (2013.01); *B60T 7/122* (2013.01); *B60W 10/02* (2013.01);
(Continued)

(58) Field of Classification Search
None
See application file for complete search history.

(56) References Cited

U.S. PATENT DOCUMENTS 7,335,133 B2 * 2/2008 Katou .................. B60W 10/06
477/167
7,815,545 B2 * 10/2010 Nakashima .......... B60W 10/02
477/138
(Continued)

FOREIGN PATENT DOCUMENTS

EP        1070868 A2 *  1/2001 ............. B60K 6/485
EP    1 770 266 A1    4/2007
(Continued)

*Primary Examiner* — Dirk Wright
(74) *Attorney, Agent, or Firm* — Foley & Lardner LLP

(57) ABSTRACT

There is provided with an automatic transmission (2) having a clutch (32) and a brake device (6) which holds a brake force during a stop of an engine (1). There is provided with an engine control section (11) which performs an automatic stop of the engine and a re-start of the engine and a release control section (14) which releases a holding of the brake force during the re-start of the engine. The release control section (14) releases the holding of the brake force when an engagement state of the clutch (32) is a predetermined state in case where an accelerator off state occurs until the engagement state of the clutch (32) becomes the predetermined state and releases the holding of the brake force when the engagement state of the clutch (32) is an engagement state weaker than the predetermined state, during a re-start of the engine (1).

7 Claims, 5 Drawing Sheets

(51) Int. Cl.
  *F02D 29/02* (2006.01)
  *B60T 7/12* (2006.01)
  *B60W 10/06* (2006.01)
  *B60W 10/18* (2012.01)
  *F16D 48/02* (2006.01)

(52) U.S. Cl.
  CPC ............ *B60W 10/06* (2013.01); *B60W 10/18* (2013.01); *F02D 29/02* (2013.01); *F16D 48/02* (2013.01); *B60T 2201/06* (2013.01); *B60W 2510/0208* (2013.01); *B60W 2540/10* (2013.01); *B60W 2710/021* (2013.01); *B60W 2710/06* (2013.01); *B60W 2710/18* (2013.01); *F16D 2500/10412* (2013.01)

(56) References Cited

U.S. PATENT DOCUMENTS

| | | | |
|---|---|---|---|
| 9,540,013 B2 * | 1/2017 | Morino | ............... F16H 61/0025 |
| 2006/0061211 A1 | 3/2006 | Ohsaki et al. | |
| 2007/0114841 A1 | 5/2007 | Maruyama et al. | |
| 2012/0115679 A1 | 5/2012 | Doering et al. | |

FOREIGN PATENT DOCUMENTS

| | | | |
|---|---|---|---|
| EP | 2014498 A2 * | 1/2009 | ............. B60K 6/445 |
| JP | 2004-148861 A | 5/2004 | |
| JP | 2006-088733 A | 4/2006 | |
| JP | 4283209 A | 6/2009 | |
| JP | 2011-117500 A | 6/2011 | |
| JP | 2012-091744 A | 5/2012 | |

\* cited by examiner

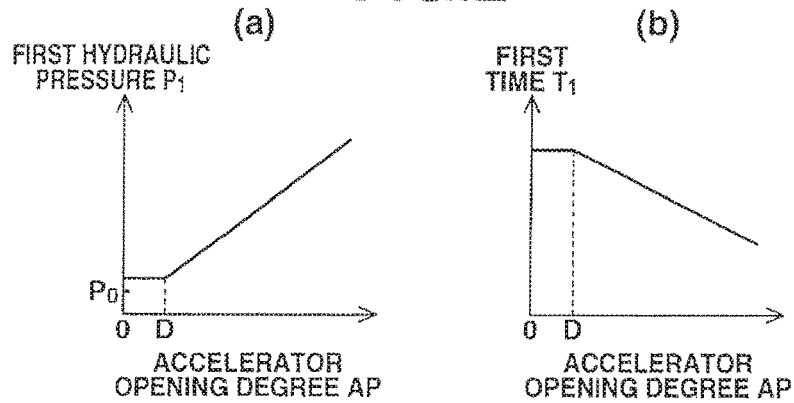
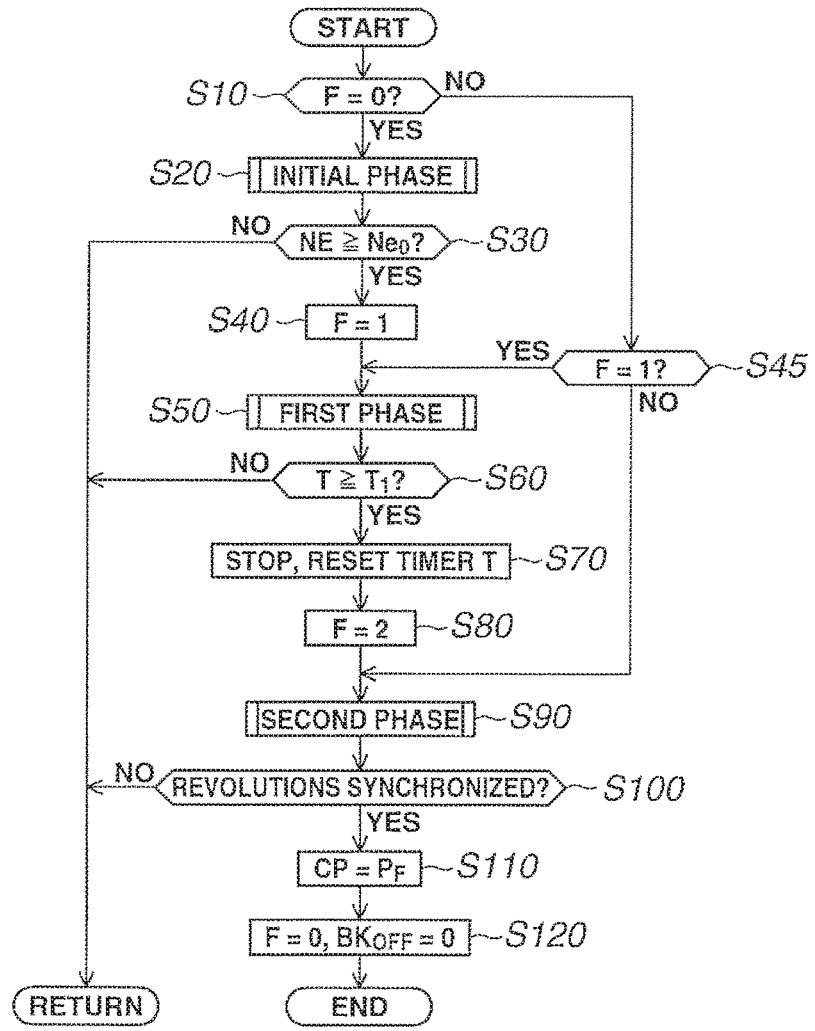

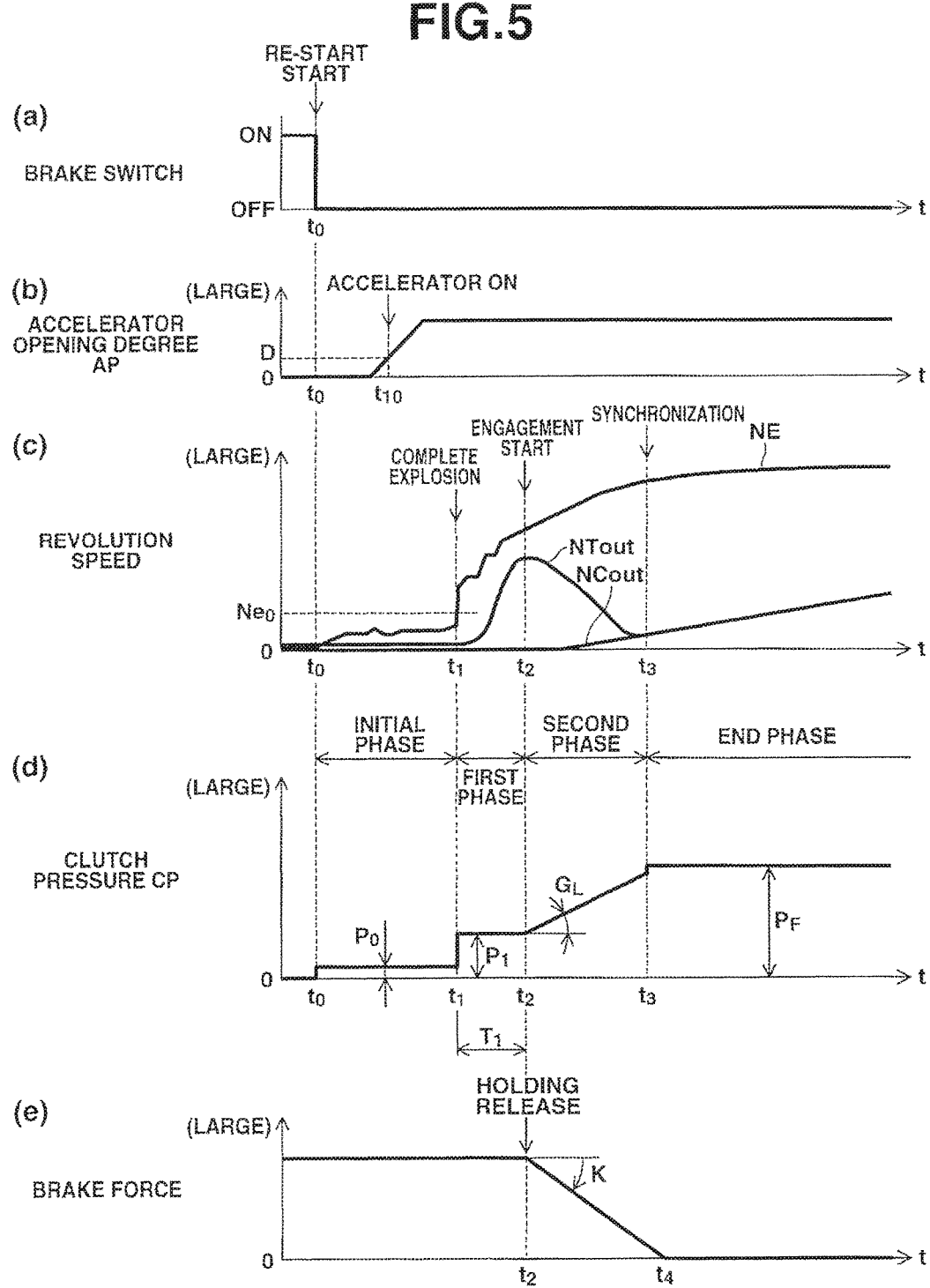

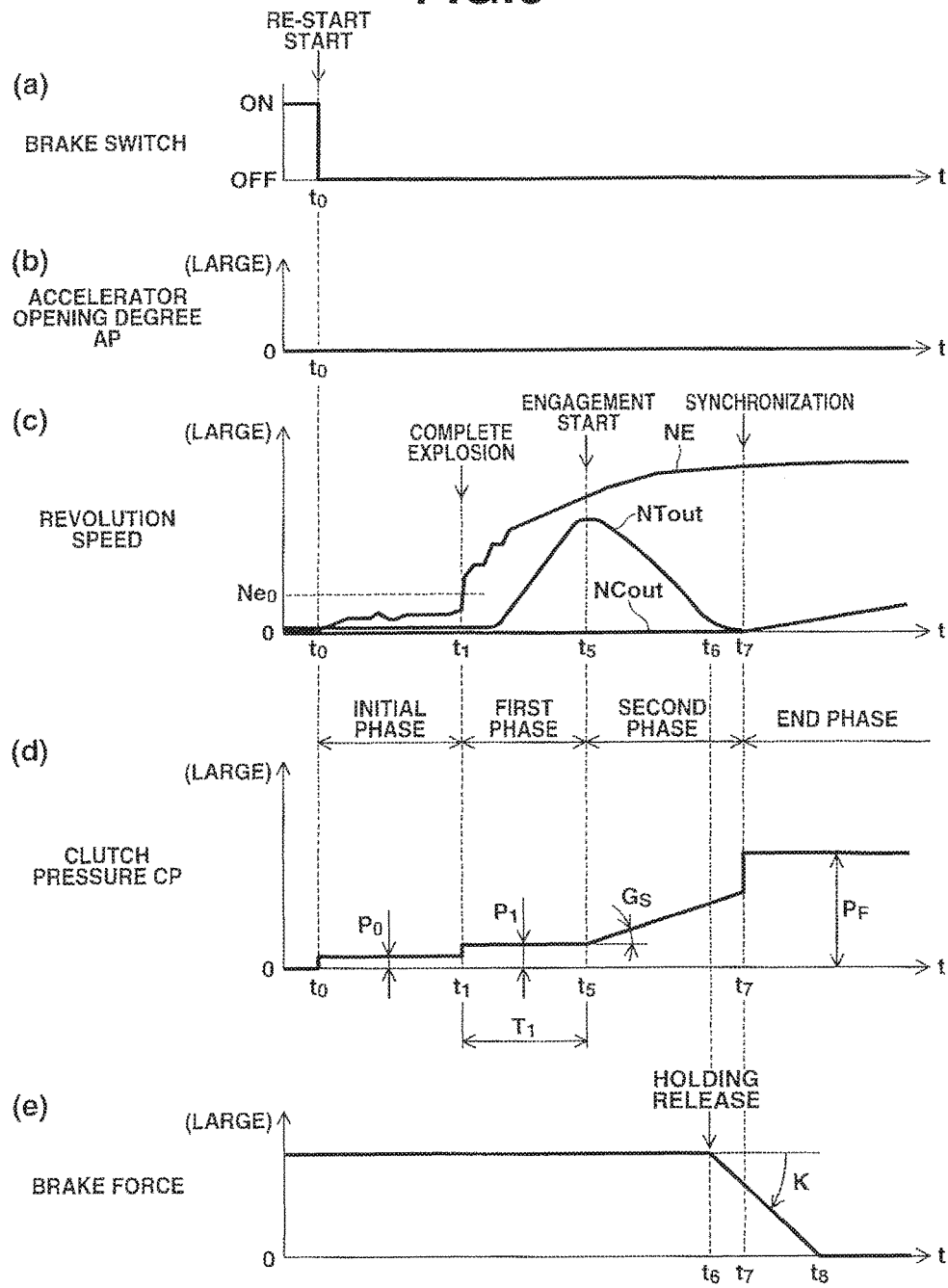

VEHICLE CONTROL APPARATUS

TECHNICAL FIELD

The present invention relates to a vehicular control apparatus in which a brake force during a re-start of an engine after an automatic stop of the engine is controlled.

BACKGROUND ART

Conventionally, a vehicle has been put into practice in which an idle stop function which improves a fuel economy (consumption) and an exhaust performance by automatically stopping an engine when a predetermined stop condition is established in a situation in which the vehicle is stopped due to a traffic signal wait during a traveling of the vehicle. After the automatic stop of the engine, the engine is automatically re-started when a predetermined start condition is established and the vehicle is started. In addition, some of the vehicles in which the idle stop functions are equipped have a function which holds a brake force for the vehicle regardless of a brake pedal manipulated variable by a driver, during an automatic stop of the engine.

For example, in the vehicle described in a Patent Document 1, a brake force holding control in which the brake force of a brake device is held constant during the automatic stop of the engine is carried out. In this brake holding control, the brake force is held constant during a predetermined brake holding time from a start of a re-start after the automatic stop of the engine so as to prevent the vehicle from a reverse movement, from the start of the re-start of the engine to a generation of a driving force. Furthermore, a brake holding time duration in accordance with a depression quantity of an accelerator pedal within a constant time from a time at which the re-start of the engine is started is searched and the brake holding time duration is modified. Thus, as the depression quantity of the accelerator pedal becomes larger, the vehicle can speedily be started.

By the way, in case of the vehicle in which an automatic transmission is intervened between the engine and a driving wheel, engagements/releases of frictional engagement elements in the automatic transmission are ordinarily controlled by a hydraulic pressure. An oil pump to generate this hydraulic pressure is generally a mechanical (oil) pump driven by the engine. In some of the vehicles, an electrically driven (oil) pump is mounted in addition to the mechanical pump.

Since the mechanical pump is stopped when the engine is stopped, a supply of the hydraulic pressure to the frictional engagement elements is stopped during the automatic stop of the engine.

In other words, in case of the vehicle in which the electrically driven pump is not provided, the engagements of the frictional engagement elements are released due to the automatic stop of the engine. In case where the vehicle is started when the start condition is established, it is necessary to again engage the frictional engagement elements. Thus, a shock is generated in a proximity of a revolution synchronization during the engagement of the frictional engagement element(s) so that an unpleasant feeling is given to a vehicular occupant (especially a driver). In addition, in case where an operation of the accelerator pedal is carried out by the driver during the start of the vehicle, it is desirable to generate the driving force at an early stage.

In contrast, in the vehicle in which the electrically driven pump is equipped in addition to the mechanical pump, the hydraulic pressure can be continued to be supplied to the frictional engagement elements by the electrically driven pump even during the automatic stop of the engine and the frictional engagement elements can be maintained in the engaged state. Thus, a task as described above does not occur. However, if the electrically driven pump is equipped, a cost increase and a weight increase cannot be avoided. Therefore, there is a demand that, without equipment of the electrically driven pimp, while the shock during the engagements of the frictional engagement elements at the time of the re-start of the engine after the automatic stop of the engine is reduced, a startability (a start performance) when the accelerator pedal is depressed is secured.

One of objects of the present invention is created in view of the task as described above. On a vehicular control apparatus in which an automatic transmission is equipped, the cost is reduced and a compatibility between a security of the startability and a suppression of the shock is established. It should be noted that, not only limited to this object, an action and an effect introduced according to each structure described as shown in the embodiment to carry out the invention which will be described later and which cannot be obtained from the conventional art can be achieved and can be positioned as another object of the present invention.

PRE-PUBLISHED DOCUMENT

Patent Document

Patent document 1: a Japanese Patent No. 4283209.

DISCLOSURE OF THE INVENTION (1) A vehicular control apparatus disclosed herein comprises: an automatic transmission which separates an engine and a driving wheel during a stop of the engine and in which frictional engagement means which engages during a start of the engine is equipped; and brake holding means for holding a brake force produced through a depressed brake pedal during the stop of the engine. The vehicular control apparatus comprises: engine control means for performing an automatic stop of the engine when a predetermined stop condition including a situation such that the brake pedal has been depressed is established and for re-starting the engine when a predetermined start condition is established during the automatic stop of the engine; and release control means for releasing a holding of the brake force of the brake holding means when a predetermined release condition including another situation such that a depression of the brake pedal has become weakened is established.

The release control means, during a re-start of the engine through the engine control means, releases the holding of the brake force when an engagement state of the frictional engagement means is a predetermined state, in case where an operation of an accelerator pedal is absent until the engagement state of the frictional engagement means becomes the predetermined state. In addition, the release control means, during the re-start of the engine through the engine control means, releases the holding of the brake force when the engagement state of the frictional engagement means is an engagement state weaker than the predetermined state, in case where the operation of the accelerator pedal is present until the engagement state of the frictional engagement means becomes the predetermined state. It should be noted that "during the re-start of the engine" means an interval of time from a time at which the start condition is established to a time at which the frictional engagement means is synchronized.

(2) The release control means preferably releases the holding of the brake force in a state in which an engagement force of the frictional engagement means is generated, in case where the operation of the accelerator pedal is present.

(3) The release control means preferably releases the holding of the brake force at a time point at which the engagement force of the frictional engagement means is generated, in a case where the operation of the accelerator pedal is present in a state in which the engagement force of the frictional engagement means is not generated.

(4) The vehicular control apparatus preferably comprises hydraulic pressure control means for controlling a hydraulic pressure supplied to the frictional engagement means. In this case, the hydraulic pressure control means preferably makes the hydraulic pressure higher than a case where the operation of the accelerator pedal is absent, in case where the operation of the accelerator pedal is present until the engagement state of the frictional engagement means becomes the predetermined state, during the re-start of the engine.

(5) The hydraulic pressure control means preferably makes the hydraulic pressure higher, as a depression quantity of the accelerator pedal becomes larger.

(6) The automatic transmission is preferably provided with a torque converter to which an output shaft of the engine is connected. In this case, the vehicular control apparatus preferably comprises: engine revolution speed detecting means for detecting an engine revolution speed which is a revolution speed of the output shaft of the engine; torque converter output revolution speed detecting means for detecting a torque converter output revolution speed which is an output revolution speed of an output shaft of the torque converter; and determination means for determining an engagement state of the frictional engagement means on a basis of the engine revolution speed and the torque converter output revolution speed.

(7) Or, according to the above-described vehicular control apparatus preferably comprises: clutch input revolution speed detecting means for detecting a clutch input revolution speed which is a revolution speed of an input shaft of the frictional engagement means: clutch output revolution speed detecting means for detecting a clutch output revolution speed which is a revolution speed of an output shaft of the frictional engagement means; and determination means for determining an engagement state of the frictional engagement means on a basis of the clutch input revolution speed and the clutch output revolution speed.

According to the disclosed vehicular control apparatus, in case where the operation of the accelerator pedal is absent, namely, when an intention to start the vehicle by the driver is weak, the brake force is released in a state in which the engagement state of the frictional engagement means is high (an engagement force of the frictional engagement means is strong) as compared with a case where the operation of the accelerator pedal is present, namely, when the intention to start the vehicle by the driver is strong. In other words, the holding of the brake force is released from a time at which at least the frictional engagement means starts the engagement, when the intention to start the vehicle is weak. Hence, an engagement shock generated when the frictional engagement means starts the engagement can be covered by the brake force. Then, the shock transmitted to the vehicular occupant during the re-start of the engine can be suppressed.

On the other hand, when the intention to start the vehicle by the driver is strong, the holding of the brake force is released at a timing earlier than when the intention to start the vehicle is weak. Hence, the startability can be improved.

Therefore, according to the disclosed control apparatus, even if the engagement of the frictional engagement means is released during the automatic stop of the engine, namely, even if the electrically driven oil pump to maintain the engagement is omitted, a compatibility between the suppression of the engagement shock of the frictional engagement means and the security of the startability can be established. In addition, since the electrically driven oil pump can be omitted, the cost can be reduced.

(a) and (b) of FIG. 2 are examples of maps used in a first phrase of a hydraulic pressure control, (a) of FIG. 2 representing a relationship of a clutch pressure with respect to an accelerator (pedal) opening degree and (b) of FIG. 2 representing a time of the first phrase with respect to the accelerator (pedal) opening degree.

Figure 1:
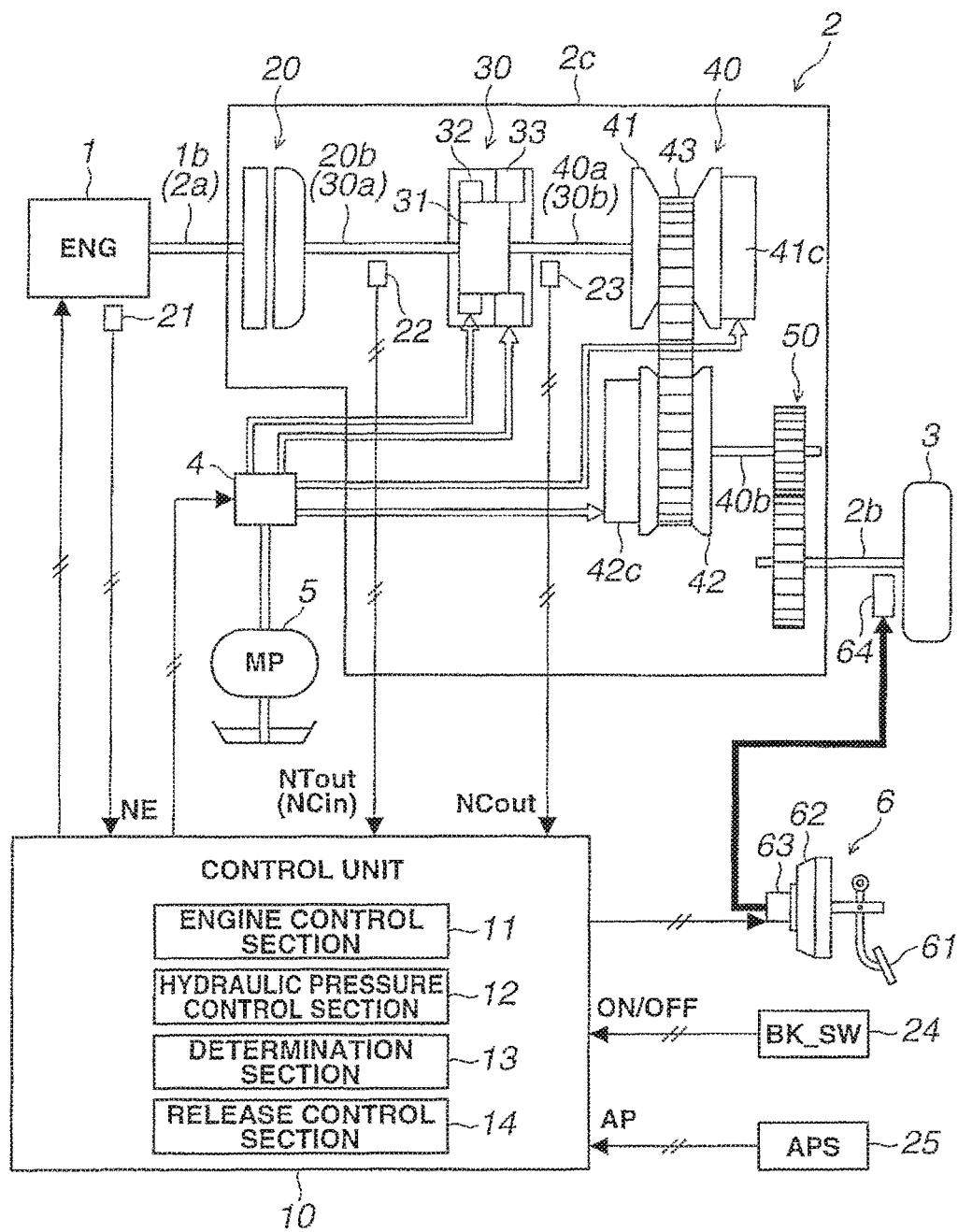
FIG. 1 is a block diagram of a control apparatus in a preferred embodiment according to the present invention representing a structure of a vehicle to which this control apparatus is applicable.

FIG. 3 is a main flowchart illustrating an example of a control procedure of a control unit shown in FIG. 1.

Figure 4:
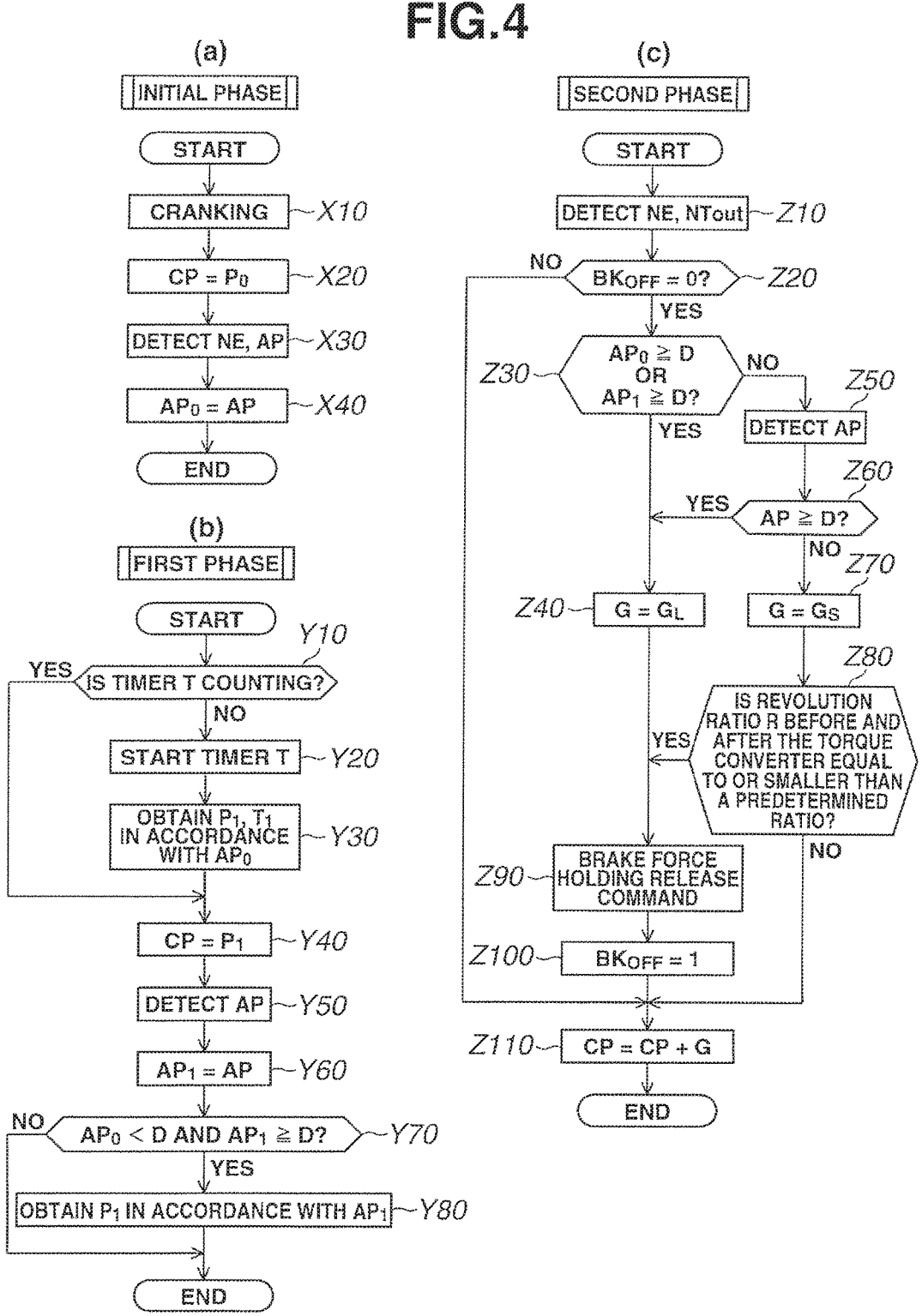

(a), (b), and (c) of FIG. 4 are sub flowcharts of the main flowchart shown in FIG. 3, (a) of FIG. 4 representing an initial phase, (b) of FIG. 4 representing a first phase, and (c) of FIG. 4 representing a second phase.

FIG. 5 is integrally a timing chart in a case where an operation of the accelerator (pedal) is carried out before a complete explosion of an engine, (a) of FIG. 5 representing a brake switch, (b) of FIG. 5 representing the accelerator (pedal) opening degree, (c) of FIG. 5 representing the revolution speed, (d) of FIG. 5 representing a clutch pressure and the control phase, and (e) of FIG. 5 representing a brake force.

FIG. 6 is integrally a timing chart in a case where the operation of the accelerator (pedal) is not carried out, (a) of FIG. 6 representing the brake switch, (b) of FIG. 6 representing the accelerator (pedal) opening degree, (c) of FIG. 6 representing the revolution speeds, (d) of FIG. 6 representing the clutch pressure and the control phase, and (e) of FIG. 6 representing the brake force.

EMBODIMENT FOR CARRYING OUT THE INVENTION

Hereinafter, a preferred embodiment according to the present invention will be explained with reference to the drawings. It should be noted that the preferred embodiment described below is, to the utmost, only an illustration and there is no intention to eliminate various modifications and applications of technical arts not explicitly shown in the preferred embodiment described below. Each structure of the preferred embodiment described below can be carried out with various modifications in a range not departing from a gist of the invention, a selection can be made according to its necessity, or appropriate combination is possible.

[1. Apparatus Structure]

[1-1. Drive Train]

As shown in FIG. 1, a control apparatus in the preferred embodiment is applied to a vehicle in which an engine (an internal combustion engine) 1 is a drive source. In the drive train of the vehicle, engine 1 and an automatic transmission 2 are installed and an output shaft 2b of automatic transmission 2 is connected to a driving wheel 3. Automatic transmission 2 includes: a torque converter 20; a forward-reverse switching mechanism 30; a belt type continuously variable transmission mechanism 40 (hereinafter, called a CVT 40); and a gear pair 50. These torque converter 20, forward-reverse switching mechanism 30, continuously variable transmission 40, and gear pair 50 are housed in a transmission casing 2c. In addition, a mechanical oil pump 5 with engine 1 as a drive source is installed in the vehicle.

Engine 1 is, for example, a generally available gasoline engine or diesel engine and is provided with an idle stop function in which engine 1 is automatically stopped in case where a predetermined stop condition is established and, thereafter, engine 1 is automatically re-started when a predetermined start condition is established. The predetermined stop condition and the predetermined start condition are determined in an engine control section 11 as will be described later.

Engine 1 is automatically stopped by stopping a combustion (fuel) injection on a basis of a command from engine control section 11, is cranked through a starting motor (not shown) operated on a basis of a command from engine control section 11, and is re-started by resuming the fuel injection.

Torque converter 20 is a starting element having a torque increase function. Torque converter 20, for example, includes: an impeller linked to an output shaft 1b of engine 1 (an input shaft 2a of automatic transmission 2 and an input shaft of torque converter 20) via a converter housing; a turbine liner linked to an output shaft 20b of torque converter 20 (an input shaft 30a of forward-reverse switching mechanism 30); and a stator installed in the case via a one way clutch. It should be noted that, when torque converter 20 requires no torque increase function, a lock-up clutch which can directly be coupled between the input shaft of torque converter 20 and output shaft 20b of torque converter 20 may be provided.

Forward-reverse switching mechanism 30 is a mechanism which changes an input revolution direction to CVT 40 between a normal revolution direction during the forward movement and a reverse revolution direction during the reverse movement. Forward-reverse switching mechanism 30, for example, includes: a double pinion type planetary gear 31 which switches a power transmission route between engine 1 side and CVT 40 side; a forward clutch (frictional engagement means) 32; and a reverse brake (frictional engagement means) 33. Forward clutch 32 (hereinafter, simply referred to as clutch 32) is a forward movement purpose frictional engagement element engaged to planetary gear 31 by means of the hydraulic pressure supplied to a hydraulic pressure chamber not shown during the forward movement of the vehicle. On the other hand, reverse brake 33 is a reverse movement purpose frictional engagement element engaged to planetary gear 31 by means of the hydraulic pressure supplied to the hydraulic pressure chamber not shown during the reverse movement of the vehicle. It should be noted that clutch 32 is released when the vehicle moves in the reverse direction and reverse brake 33 is released when the vehicle moves in the forward direction.

CVT 40 is a mechanism which continuously (steplessly) changes a ratio between the input revolution speed of automatic transmission 2 and the output revolution speed of automatic transmission 2 (namely, a speed ratio (a transmission gear ratio)). CVT 40 includes: a primary pulley 41; a secondary pulley 42; and a belt 43 wound around these two pulleys 41, 42. A primary pulley 41 is equipped on a primary shaft 40a (output shaft 30b of forward-reverse switching mechanism 30) connected to input shaft 30a via forward-reverse switching mechanism 30 and a secondary pulley 42 is equipped on a secondary shaft 40b installed in parallel to primary shaft 40a.

Primary pulley 41 and secondary pulley 42 include: oppositely arranged fixture pulley and movable pulley; and hydraulic pressure cylinders 41c, 42c which axially move the respective movable pulleys. The hydraulic pressure is supplied from oil pump 5 to each hydraulic pressure cylinder 41c, 42c. Thus, each movable pulley of primary pulley 41 and secondary pulley 42 is moved so that a winding radius of belt 43 to primary pulley 41 and secondary pulley 42 is modified and the speed ratio is continuously varied.

It should be noted that secondary shaft 40b is connected to output shaft 2b of automatic transmission 2 via gear pair 50 and the revolution gearshifted by automatic transmission 2 is transmitted to driving wheel 3 and the vehicle is driven by the revolution of driving wheel 3.

Oil Pump 5 is driven by engine 1 and supplies oil to a hydraulic pressure circuit under pressure. A pressure regulating device 4 is installed on the hydraulic pressure circuit which is, for example, constituted by a plurality of electromagnetic valves. Pressure regulating device 4 pressure regulates oil supplied from oil pump 5 in accordance with the command from a hydraulic pressure control section 12 as will be described later to an appropriate pressure. For example, during the forward movement of the vehicle, oil (a source pressure) supplied under pressure from oil pump 5 is pressure regulated to the hydraulic pressure to engage clutch 32 to planetary gear 31 (hereinafter, called a clutch pressure CP) so as to supply clutch pressure CP to a hydraulic pressure chamber for clutch 32.

It should be noted that, since oil pump 5 is driven only during an operation of engine 1, oil pump 5 is stopped during the stop of engine 1 and oil falls out from the hydraulic pressure circuit. Thus, in case where engine 1 is automatically stopped, the hydraulic pressure falls out from the hydraulic pressure circuit connected to the hydraulic pressure chamber for forward movement purpose clutch 32 and clutch 32 is released.

Hence, it is necessary to again engage clutch 32 during the re-start after the automatic stop of engine 1.

[1-2. Brake System]

The vehicle is provided with a brake device (brake holding means) 6 which gives the brake force to the vehicle in accordance with the operation of brake pedal 61 by the driver. Brake device 6 is a generally available hydraulic pressure type disc brake and includes a brake booster 62, a master cylinder 63, and a brake pad 64. A depression force given to brake pedal 61 is boosted by brake booster 62, inputted to master cylinder 63, and is transmitted to a brake fluid which is charged in an inside of master cylinder 63 as a pressure to generate a brake pressure. This brake pressure is supplied to brake pad 64 installed in each road wheel and a frictional braking force (the brake force) is given to each road wheel by grasping the brake disc with brake pad 64.

In addition, brake device 6 has a function to hold the brake force on a basis of a command from release control section 14 as will be described later, regardless of a manipulated variable of brake pedal 61 by the driver. For example, in case where engine 1 is automatically stopped, a command to hold the brake force is issued from release control section 14 to brake device 6 and the brake force is held after the release of brake pedal 61. In addition, in case where the command to release the brake force is received from release control section 14, the brake force is gradually reduced at a constant gradient K and the holding of the brake force is released.

[1-3. Detecting System. Control System]

An engine revolution speed sensor (engine revolution speed detecting means) 21 which detects a revolution speed NE of a crankshaft (a revolution number per unit time and, hereinafter, called an engine revolution speed NE) is installed in engine 1. In addition, an output revolution speed sensor 22 (torque converter output revolution speed detecting means, clutch input revolution speed detecting means) which detects a revolution speed NTout of output shaft 20b of torque converter 20 (hereinafter, called torque converter output revolution speed NTout) and a primary revolution speed sensor 23 (clutch output revolution speed detecting means) which detects a revolution speed $NC_{OUT}$ of primary shaft 40a are installed in automatic transmission 2.

It should be noted that torque converter output revolution speed NTout is the same as revolution speed NCin of input shaft 30a of forward-reverse switching mechanism 30 (hereinafter, called a clutch input revolution speed NCin) (NTout=NCin). In addition, revolution speed NCout of primary shaft 40a corresponds to the revolution speed of output shaft 30b of forward-reverse switching mechanism 30 and, hereinafter, is called a clutch output revolution speed NCout. These revolution speed sensors 21 through 23, at any time, detect revolution speeds NE, NTout (NCin), NCout and output detected results to a control unit 10 as will be described later.

Brake device 6 is provided with a brake switch (BK_SW) 24 which detects a presence or absence of a depression on brake pedal 61. Brake switch 24 outputs an on signal to control unit 10 when brake pedal 61 is depression operated and outputs an off signal to control unit 10 when brake pedal 61 is released (not depression operated).

In addition, an accelerator position sensor (APS) 25 is installed in a proximity of the accelerator pedal (not shown). Accelerator position sensor 25 detects an accelerator opening degree AP corresponding to the depression quantity of the accelerator pedal and this accelerator opening degree AP corresponds to a magnitude of an output demanded by the driver (a demanded output and a start intention). Accelerator position sensor 25 outputs detected accelerator opening degree AP to control unit 10.

The vehicle is provided with control unit 10 (Electronic Control Unit) including a CPU which executes various calculation processes, a ROM in which programs and data required for the controls are stored, a RAM in which calculation results in CPU are temporarily stored, an input/output port to input and output signals between an internal of control unit 10 and an external of control unit 10, and a timer to count (measure) a time.

The above-described various sensors 21 through 25 are connected to the input side of control unit 10 and engine 1, pressure regulating device 4, and brake device 6 are connected to the output side of control unit 10.

[2. Control Structure]

Control unit 10 in this embodiment carries out the hydraulic pressure control for controlling clutch pressure CP supplied to the hydraulic pressure chamber of clutch 32 during the re-start of engine 1 after the automatic stop of engine 1 and the brake release control which controls holding and release timings of the brake force by means of brake device 6. As shown in FIG. 1, control unit 10 includes, as elements to carry out such controls as described above, an engine control section 11, a hydraulic pressure control section 12, a determination section 13, and a release control section 14.

These respective elements may be realized by electronic circuits (hardware), by programming as software, or a part of functions of these respective elements may be installed as hardware and the other part thereof may be programmed as software.

It should be noted that, in this embodiment, all elements are installed in a single control unit but these elements may be shared into a plurality of control units, each of the control units being structured to enable the information transmission.

[2-1. Automatic Stop of the Engine and Re-Start Control]

Engine control section (engine control means) 11 comprehensively controls a wide range of system such as an ignition system, a fuel system, an intake-and-exhaust system, and a valve operated system related to engine 1. Specifically, engine control section 11 controls an air quantity supplied to each cylinder of engine 1, a fuel injection quantity supplied to each cylinder of engine 1, an ignition timing of each cylinder, a turbo charger pressure, and so forth. In this embodiment, the automatic stop of engine 1 and the re-start control of engine 1 will be explained.

Engine control section 11 automatically stops engine 1 by stopping the combustion injection when the predetermined stop condition during traveling of the vehicle is established, by operating the starter motor so that engine 1 is cranked when the predetermined start condition during the automatic stop is established, and engine 1 is re-started by resuming the fuel injection. The predetermined stop condition is that, for example, all of the following (A), (B), and (C) are satisfied.

(A) Accelerator opening degree AP is zero (AP=0, accelerator off)
(B) Brake switch 24 is on (brake on)
(C) Vehicle speed is equal to or below a predetermined vehicle speed $V_0$ ($V \leq V_0$)

That is to say, engine control section 11 automatically stops engine 1 in case where the operation of the accelerator pedal is absent, brake pedal 61 is depressed, and further the condition of vehicle speed V is satisfied. It should be noted that, on the above-described (C), vehicle speed V may be calculated from clutch output revolution speed NCout or a vehicle speed sensor which detects vehicle speed V may be installed.

In addition, predetermined vehicle speed $V_0$ is a preset stop allowance vehicle speed and is a vehicle speed at which engine 1 can be stopped.

On the other hand, the predetermined start condition is that any one of the above-described condition items (A) through (C) is not satisfied. That is to say, the predetermined start condition is a case where the accelerator pedal has been depressed, a case where brake switch 24 is turned off, and a case where the vehicle is started to move due to some reason. Engine control section 11, in case where the predetermined start condition is established, informs (transmits) to hydraulic pressure control section 12 and release control section 14 that the start condition is established.

[2-2. Hydraulic Pressure Control]

When the information that the start condition is established is transmitted from engine control section 11, hydraulic pressure control section 12 controls clutch pressure CP to engage clutch 32 to start the vehicle. This is because oil pump 5 is stopped due to the automatic stop of engine 1 as described above so that clutch 32 is released.

Since, while clutch 32 is released, the driving force is not transmitted to driving wheel 3 (engine 1 and driving wheel 3 are separated from each other), a timing at which the driving force is generated becomes more delayed as a time duration from a time at which the start condition is established to a time at which the engagement start of clutch 32 is carried out becomes longer.

Therefore, hydraulic pressure control section 12 quickly starts the engagement of clutch 32 in accordance with the intention to start the vehicle by the driver after the establishment of the start condition and controls clutch pressure CP in such a way that a time duration to a synchronization of the input and output revolutions of clutch 32 becomes as short as possible. It should be noted that a time duration from a time at which the engagement start of clutch 32 is carried out to a time at which the revolution synchronization is carried out is also called an engagement latter half.

Hereinafter, the hydraulic pressure control by hydraulic pressure control section 12 will be explained using timing charts of (a) through (e) of FIG. 5 and of (a) through (e) of FIG. 6.

(a) through (e) of FIG. 5 are integrally the timing chart in case where the operation of the accelerator pedal is present after the establishment of the start condition, namely, in case where the driver has the intention to start the vehicle during the re-start.

(a) through (e) of FIG. 6 are integrally the timing chart in case where the operation of the accelerator pedal is absent after the establishment of the start condition, namely, in case where the drive has no intention to start the vehicle during the re-start. It should be noted that "during the re-start" recited herein refers to an interval of time from a time point at which the start condition is established (namely, the start of the re-start) to a time at which the revolutions of clutch 32 are synchronized [for example, the interval of time of times $t_0$ through $t_3$ in (c) of FIG. 5 and the interval of time of times $t_6$ through $t_7$ (c) of FIG. 6].

Hydraulic pressure control section 12 controls clutch pressure CP to an initial hydraulic pressure $P_0$ during a time duration from a time point (time $t_0$) at which the start condition has been established to a time point (time $t_1$) at which engine 1 has made a complete explosion, as shown in (d) of FIG. 5 and in (d) of FIG. 6. When the start condition is established and the cranking of engine 1 has started, the operation of oil pump 5 is also started. Hence, hydraulic pressure control section 12 controls clutch pressure CP to an initial hydraulic pressure $P_0$ during this interval of time so that oil is loaded to the hydraulic pressure circuit connected to the hydraulic pressure chamber for clutch 32.

It should be noted that initial hydraulic pressure $P_0$ is a small pressure of a degree such that clutch 32 has no torque capacity during the cranking and oil is loaded to the hydraulic pressure circuit to a degree such that clutch 32 is not abruptly engaged during the cranking. Since this initial hydraulic pressure $P_0$ is provided, a first phase as will be described later can be started every time in the same state. In addition, the shock due to a sudden grasp of clutch 32 can be prevented and a load cannot be placed on engine 1 during the cranking.

Whether engine 1 has become the complete explosion is determined as follows. That is to say, the complete explosion is determined at a time point at which engine revolution speed NE becomes equal to or higher than a predetermined threshold speed $Ne_0$, as shown in (c) of FIG. 5 and (c) of FIG. 6. This determination is carried out by engine control section 11, the information of the complete explosion may be transmitted from engine control section 11 to hydraulic pressure control section 12, or hydraulic pressure control section 12 may directly be carried out. Hereinafter, a control interval of time (a control phase) from a time point at which the start condition of engine 1 is established (a re-start start time point) to a time at which engine 1 has become the complete explosion is called an initial phase.

Hydraulic pressure control section 12 controls clutch pressure CP to a first hydraulic pressure $P_1$ which is higher than initial hydraulic pressure $P_0$, after the complete explosion of engine 1, during a time duration during which a predetermined first time $T_1$ has elapsed to start the engagement of clutch 32. That is to say, a time point at which first time $T_1$ has elapsed corresponds to a time point at which the engagement of clutch 32 is started (time $t_2$ in (c) of FIG. 5 and time $t_5$ of (c) of FIG. 6). Hereinafter, a control interval of time (control phase) from the complete explosion time point of engine 1 to the engagement start time point of clutch 32 is called a first phase.

In this embodiment, hydraulic pressure control section 12 obtains a first hydraulic pressure $P_1$ and a first time $T_1$ in accordance with the vehicular start intention by the driver at the initial phase using maps, for example, as shown in (a) and (b) of FIG. 2.

(a) and (b) of FIG. 2 show maps setting relationships of first hydraulic pressure $P_1$ and first time $T_1$ with respect to accelerator (pedal) opening degree AP. As shown in (a) of FIG. 2, first hydraulic pressure $P_1$ is set to a relatively low constant value when accelerator (pedal) opening degree AP is smaller than a predetermined value D and is set to become larger as accelerator (pedal) opening angle AP is equal to or larger than predetermined value D.

On the other hand, as shown in (b) of FIG. 2, first time $T_1$ is set to a relatively longer constant value when accelerator (pedal) opening degree AP is smaller than predetermined value D and is set to a relatively shorter as accelerator opening degree AP becomes increased when accelerator opening degree AP is equal or larger than predetermined value D. It should be noted that predetermined value D is a preset threshold value opening degree to determine a presence or absence of the intention to start the vehicle by the driver and is a small value near to zero. It should, herein, be noted that, when accelerator opening degree AP is smaller than predetermined value D, an accelerator off (no intention to start the vehicle) is indicated and, when accelerator opening degree AP is equal to or larger than predetermined value, an accelerator on (the intention to start the vehicle) is indicated.

Hence, in case where hydraulic pressure control section 12 controls clutch pressure CP to relatively low first hydraulic pressure $P_1$ and starts the engagement of clutch 32 for relatively long first time $T_1$, assuming that the driver has no intention to start the vehicle, in case where accelerator opening degree AP at the initial phase is smaller than predetermined value D (AP<D), as shown in (b) and (d) of FIG. 6.

On the other hand, as shown in (b) and (d) of FIG. 5, in case where accelerator opening degree AP is equal to or larger than predetermined value D (AP≥D) at the initial phase, hydraulic pressure control section 12 controls clutch pressure CP to the relatively high first hydraulic pressure $P_1$ in accordance with accelerator opening degree AP, assuming that the driver has the intention to start the vehicle, and starts the engagement of clutch 32 during the short first time $T_1$. In other words, as accelerator opening degree AP becomes larger, the high hydraulic pressure is supplied to clutch 32 during a short period of time.

It should be noted that accelerator opening degree AP at the initial phase is smaller than predetermined value D, the accelerator pedal is depressed at the thereafter first phase, and accelerator opening degree AP often becomes equal to or larger than predetermined value D.

In such a case as described above, hydraulic pressure control section 12 increasingly corrects (corrects in an increasing manner) clutch pressure CP after a time point at which accelerator opening degree AP is equal to or larger than predetermined value D. That is to say, in case where accelerator opening degree AP at the initial phase is smaller than predetermined value D and accelerator opening degree AP at the first phase is equal to or larger than predetermined value D, accelerator opening degree AP at the first phase is applied to, for example, a map shown in (a) of FIG. 2 to obtain a new first hydraulic pressure $P_1$. Then, clutch pressure CP is controlled to this new first hydraulic pressure $P_1$.

In addition, in case where accelerator opening degree AP is equal to or larger than predetermined value D at the initial phase, the accelerator pedal is often largely depressed at the first phase. In such a case as described above, hydraulic pressure control section 12 may correct first hydraulic pressure $P_1$ in a manner of a pressure increase of first hydraulic pressure $P_1$ on a basis of accelerator (pedal) opening degree AP at the first phase or may maintain first hydraulic pressure $P_1$ obtained from accelerator (pedal) opening degree AP at the initial phase. In a former case, the time point at which the engagement start of clutch 32 can further be quickened and, in a latter case, the control structure can be simplified.

Hydraulic pressure control section 12 increases clutch pressure CP in a ramp state at a predetermined gradient (increase quantity) G while the input and output revolutions of clutch 32 are synchronized, after the engagement start of clutch 32. In other words, hydraulic pressure control section 12 advances the engagement of clutch 32 by gradually increasing clutch pressure CP after the engagement start of clutch 32 and synchronizes the input and output revolutions of clutch 32.

Hereinafter, an interval of control (a control phase) from a time point at which the engagement start of clutch 32 is carried out to a time point at which the input and output revolutions of clutch 32 are synchronized is called a second phase.

Hydraulic pressure control section 12 gradually increases clutch pressure CP at a relatively large gradient $G_L$ in case where, in at least either one of the initial phase and the first phase, accelerator opening degree AP is equal to or larger than predetermined value D (in a case of an accelerator on). On the other hand, in a case where accelerator opening degree AP is smaller than predetermined value D in both cases of the initial phase and the first phase (a case of an accelerator off), clutch pressure CP is gradually increased at a gradient $G_S$ smaller than gradient $G_L$.

Hydraulic pressure control section 12 controls clutch pressure CP to a final pressure $P_F$ to complete the engagement of clutch 32 after the synchronization of input and output revolutions of clutch 32. This final pressure $P_F$ is preset to a hydraulic pressure at which clutch 32 is completely engaged and this engagement state can be maintained and is a constant value regardless of accelerator opening degree AP. Hereinafter, a control interval of time (a control phase) from a time point at which the input and output revolutions of clutch 32 are synchronized to a time point at which the engagement has been completed is called an end phase. It should be noted that hydraulic pressure control section 12 transmits the control phase to release control section 14.

[2-3. Brake Release Control]

Release control section (release control means) 14 issues a command to brake device 6 to hold the brake force for the vehicle in case where engine 1 is automatically stopped by means of engine control section 11.

Furthermore, release control section 14 issues a command (hereinafter, called a hold release command) to brake device 6 to release the holding of the brake force so that the holding of the brake force is released, in case where a predetermined release condition is established. The predetermined release condition includes a situation such that at least depression of brake pedal 61 becomes weakened. Release control section 14 modifies a timing at which the holding release command is issued in accordance with the engagement state of clutch 32 determined by determination section 13 and accelerator opening degree AP.

In this embodiment, the engagement state of clutch 32 is determined on a basis of engine revolution speed NE and torque converter output revolution speed $NT_{OUT}$ and the result of determination (namely, the engagement state) is transmitted to release control section 14. Torque converter output revolution speed $NT_{OUT}$ is raised together with the rise of engine revolution speed NE before the engagement start of clutch 32. After the engagement of clutch 32 is started, as the engagement state becomes advanced (as a degree of progress of engagement becomes larger), torque converter output revolution speed $NT_{OUT}$ becomes approached to clutch output revolution speed $NC_{OUT}$. In other words, torque converter output revolution speed $NT_{OUT}$ becomes more separate from engine revolution speed NE as the engagement force of clutch 32 becomes stronger. Then, determination section 13 determines the engagement state (engagement force) of clutch 32, for example, from a rate R (namely, a revolution ratio R before and after the torque converter) of torque converter output revolution speed $NT_{OUT}$ with respect to engine revolution speed NE.

Release control section 14 issues the holding release command when the engagement state of clutch 32 is a predetermined state to release the holding of clutch 32, in case where no operation of the accelerator pedal is carried out (in the case of accelerator off) until the engagement state of clutch 32 becomes the predetermined state.

On the other hand, release control section 14 issues the holding release command to release the holding of the brake force when the engagement state of clutch 32 becomes an engagement state weaker than the predetermined state in case where the operation of the accelerator pedal is present until the engagement state of clutch 32 becomes the predetermined state (a case of the accelerator on), during the re-start of engine 1.

It should be noted that the engagement state of clutch 32 is determined by above-described determination section 13 and corresponds to the degree of progress of the engagement of clutch 32 (to what degree the engagement is advanced from the start of engagement) or to the engagement force of clutch 32. In addition, the above-described predetermined state is a state in which at least engagement force of clutch 32 is generated (namely, a state after the engagement of clutch 32 is started) and, in this embodiment, the predetermined state is set to the latter half of the engagement of clutch 32. Determination section 13 determines that the engagement state of clutch 32 becomes the predetermined state when a ratio R (a revolution ratio R before and after the torque converter) of torque converter output revolution speed $NT_{OUT}$ with respect to engine revolution speed NE becomes equal to or below the predetermined rate. Hereinafter, a specific explanation thereof will be made.

Release control section 14 releases the holding of the brake force in a state in which the engagement force of clutch 32 is generated, in case where the operation of the accelerator pedal is present until the engagement state of clutch 32 becomes the predetermined state. Specifically, as shown in (a) through (e) of FIG. 5, in a case where accelerator opening degree AP becomes equal to or larger than predetermined value D from a time point at which the start condition of engine 1 is established (the re-start start time point, time $t_0$) before a time point (time $t_2$) at which the engagement start of clutch 32 is carried out (accelerator on), release control section 14 issues the holding release command at the time point (time $t_2$) at which clutch 32 starts the engagement. In other words, release control section 14 issues the holding release command at the time point (a transfer time point to the second phase) at which the engagement force of clutch 32 is generated when it becomes the accelerator on in a state in which the engagement force is not generated (when the control phase by hydraulic pressure control section 12 is either the initial phase or the first phase).

In this way, the brake force for the vehicle is gradually released by issuing the holding release command at a time point at which the engagement of clutch 32 is started (namely, at a time point at which clutch 32 has started to have a capacity), in case where the driver has the intention to start the vehicle, and the startability of the vehicle is secured. On the other hand, the brake force is held up to a time point at which the engagement of clutch 32 is started. Thus, in case where the vehicle is stopped on an (ascending or descending) slope, a slide down due to a self-weight of the vehicle can be prevented.

In addition, release control section 14 issues the holding release command at the time point (namely, at the time point at which accelerator opening degree AP becomes equal to or larger than predetermined value D) at which accelerator opening degree AP becomes equal to or larger than predetermined value D, in case where accelerator opening degree AP becomes equal to or larger than predetermined value D during a time duration (at the second phase) from a time point (time $t_2$) at which the engagement of clutch 32 is started to a time point at which the engagement state of clutch 32 becomes the predetermined state. In other words, in case where the operation of the accelerator pedal by the driver is present after the engagement start of clutch 32, the holding release command of the brake force is issued at a time point of the accelerator on. Thus, the brake force for the vehicle is gradually released and the startability of the vehicle is secured.

On the other hand, release control section 14 issues the holding release command when the engagement state of clutch 32 is the predetermined state (a time $t_6$), in case where the operation of the accelerator pedal is absent (in case where accelerator opening degree AP is smaller than predetermined value D) until the engagement state of clutch 32 becomes the predetermined state from a time point at which the start condition of engine 1 is established (a time point from which the re-start of engine 1 is started, time $t_0$), as shown in (a) through (e) of FIG. 6. Thus, brake device 6 gradually releases the holding of the brake force in a state in which the engagement state of clutch 32 is a relatively advanced state (namely, in a state in which the engagement force is strong) and becomes a state in which the brake force is left present until a time point at which the revolution synchronization of clutch 32 is established.

It is known that the engagement shock is more or less generated when the engagement of clutch 32 is started (especially, when the input and output revolutions of clutch 32 are synchronized) and the engagement shock is covered by leaving the brake force until the time point at which the engagement shock is generated to prevent the shock from being directly transmitted to the driver. In other words, in case where the operation of the accelerator pedal is absent until the engagement state of clutch 32 becomes the predetermined state, the start intention by the driver is weak. Hence, a higher priority of the shock reduction is taken than the startability. A hold release timing of the brake force is more delayed than when the operation of the accelerator pedal is present.

[3. Flowchart]

Next, using FIG. 3 and (a) through (c) of FIG. 4, examples of procedures of the hydraulic pressure control and the brake release control executed in control unit 10 will be explained. FIG. 3 shows a main flowchart and (a) through (c) of FIG. 4 show the sub flowcharts in FIG. 3.

These flowcharts are repeatedly carried out at a predetermined calculation frequency period from the time point at which the start condition is established after engine 1 is automatically stopped by means of engine control section 11 and until the engagement of clutch 32 is completed.

As shown in FIG. 3, at a step S10, control unit 10 determines whether a flag F is F=0. It should, herein, be noted that this flag F denotes the control phase by means of hydraulic pressure control section 12 and F=0 denotes the initial phase, F=1 denotes the first phase, and F=2 denotes the second phase, respectively. Since flag F is set as F=0 when the flowchart of FIG. 3 is started, the routine goes to a step S20. At step S20, the flowchart of the initial phase shown in (a) of FIG. 4 is executed.

As shown in (a) of FIG. 4, at a step X10, a cranking of engine 1 is carried out by means of engine control section 11. At the next step X20, hydraulic pressure control section 12 controls clutch pressure CP to initial hydraulic pressure $P_0$ (CP=$P_0$). At the next step X30, control unit 10 detects engine revolution speed NE and accelerator opening degree AP. At the next step X40, control unit 10 stores accelerator opening degree AP detected at step X30 as an initial accelerator opening degree $AP_0$ ($AP_0$=AP) and, then, this sub flowchart is ended.

At a step S30 in FIG. 3, control unit 10 determines whether engine revolution speed NE detected at step X30 is equal to or larger than a predetermined threshold value $Ne_0$ (NE≥$Ne_0$). If engine revolution speed NE is smaller than a predetermined threshold speed $Ne_0$, this flowchart is returned and the flowchart of the initial phase is again executed.

Then, the flowchart of the initial phase is again executed. When engine 1 indicates the complete explosion (when NE≥$Ne_0$), the routine goes to a step S40 in which flag F is set to F=1. At the next step S50, the flowchart of the first phase shown in (b) of FIG. 4 is executed.

As shown in (b) of FIG. 4, control unit 10 determines whether timer T is being counted at a step Y10. the counting of timer T is not started in case where the routine first advances to step Y10. Hence, the routine goes to a step Y20 in which the counting of timer T is started. At the next step Y30, hydraulic pressure control section 12 obtains first hydraulic pressure $P_1$ and first time $T_1$ in accordance with initial accelerator opening degree $AP_0$ stored at the initial phase. Then, at a step Y40, clutch pressure CP is controlled to first hydraulic pressure $P_1$ (CP=$P_1$).

At the next step Y50, accelerator opening degree AP is detected and accelerator opening degree AP is stored as a first accelerator opening degree $AP_1$ at a step Y60 ($AP_1$=AP). At the next step Y70, control unit 10 determines whether initial accelerator opening degree $AP_0$ is smaller than predetermined value D and first accelerator opening degree $AP_0$ is equal to or larger than predetermined value D. In other words, control unit 10 determines whether accelerator opening degree AP, at first, becomes equal to or larger than predetermined value D. In case where this condition is satisfied, first hydraulic pressure $P_1$ is again obtained in accordance with first accelerator opening degree $AP_1$ at step Y80. In other words, in case where accelerator opening degree AP, at first, becomes equal to or larger than predetermined value D at the first phase, clutch pressure CP is increasingly pressure corrected.

On the other hand, in case where accelerator opening degree AP is already equal to or larger than predetermined value D at the initial phase or in case where accelerator opening degree AP is smaller than predetermined value D at the initial phase or at the first phase, this flowchart of (b) of FIG. 4 is ended.

At a step S60 of FIG. 3, control unit 10 determines whether the count value of timer T is equal to or larger than first time $T_1$ obtained at step Y30 ($T \geq T_1$). That is to say, control unit 10 determines whether the first phase is executed for first time $T_1$. If the count value of timer T is smaller than first time $T_1$, this flowchart of FIG. 3 is returned and the determination at step S10 is executed. In this case, since flag F is set to F=1, the routine goes from step S10 to a step S45. At step S45, control unit 10 determines whether flag F is F=1 and the routine goes to step S50.

As shown in (b) of FIG. 4, at the next control period, the routine goes to a step Y40 since timer T is being counted. The same processing as described above is repeatedly carried out. Then, at a step S60 of FIG. 3, if the count value of timer T becomes equal to or larger than first time $T_1$, the count of timer T is stopped at a step S70 and is reset. At the next step S80, flag F is set to F=2. At the next step S90, the flowchart of the second phase shown in (c) of FIG. 4 is started.

As shown in (c) of FIG. 4, at a step Z10, control unit 10 detects engine revolution speed NE and torque converter output revolution speed $NT_{OUT}$. At a step Z20, control unit 10 determines whether a flag $BK_{OFF}$ is $BK_{OFF}$=0. It should, herein, be noted that flag $BK_{OFF}$ is a variable to check whether the holding release command of the brake force is issued by release control section 14, $BK_{OFF}$=0 corresponds to a state in which the holding release command is not issued, and $BK_{OFF}$=1 corresponds to a state in which the holding release command is issued.

Since, when the flowchart of (c) of FIG. 4 is started, flag $BK_{OFF}$ is set to $BK_{OFF}$=0, the routine of (c) of FIG. 4 goes to a step Z30. At step Z30, control unit 10 determines whether either initial accelerator opening degree $AP_0$ or first accelerator opening degree $AP_1$ is equal to or larger than predetermined value D ($AP_0 \geq D$ or $AP_1 \geq D$). That is to say, control unit 10 determines whether, at the initial phase or the first phase, accelerator opening degree AP is equal to or larger than predetermined value D. If accelerator opening degree AP at the initial phase or at the first phase is equal to or larger than predetermined value D, the routine goes to step Z40. A gradient G of clutch pressure CP at the second phase is set to a relatively large gradient $G_L$.

Then, at a step Z90, the holding release command of the brake force is issued by release control section 14. Thus, brake device 6 gradually reduces the brake force at a constant gradient K to release the holding of the brake force. At a step Z100, flag $BK_{OFF}$ is set to $BK_{OFF}$=1. At a step Z110, clutch pressure CP is controlled to a value of clutch pressure CP at the previous period to which gradient G set at step Z40 is added. Then, this flowchart of (c) of FIG. 4 is ended.

On the other hand, in case where, at the determination of step Z30, both of initial accelerator opening degree $AP_0$ and first accelerator opening degree $AP_1$ are smaller than predetermined value D ($AP_0$<D and $AP_1$<D), the routine goes to a step Z50 at which accelerator opening degree AP is detected. At the next step Z60, control unit 10 determines whether this accelerator opening degree AP is equal to or larger than predetermined value D ($AP \geq D$). In other words, in case where accelerator opening degree AP is smaller than predetermined value D at the initial phase or the first phase, control unit 10 always determines whether the accelerator pedal has been depressed at the second phase.

If accelerator opening degree AP detected at step Z50 is smaller than predetermined value D, the routine goes from step Z60 to a step Z70. At step Z70, gradient G of clutch pressure CP at the second phase is set to a relatively small gradient $G_S$. At the next step Z80, control unit 10 determines whether a rate (ratio) R between engine revolution speed NE and torque converter output revolution speed $NT_{OUT}$ detected at step Z10 (a revolution ratio R before and after the torque converter) is equal to or smaller than a predetermined rate (ratio). If revolution ratio R before and after the torque converter is larger than the predetermined rate (ratio), the routine goes from step Z80 to a step Z110. At step Z110, clutch pressure CP is controlled to a value of clutch pressure CP at a previous period to which gradient G set at step Z70 is added. Then, this flowchart of (c) of FIG. 4 is ended.

At a step S100 in FIG. 3, control unit 10 determines whether the input and output revolutions of clutch 32 are synchronized. If not synchronized, this flowchart is returned. This determination is carried out using, for example, torque converter output revolution speed $NT_{OUT}$ (namely, clutch input revolution speed $NC_{in}$) and clutch output revolution speed $NC_{OUT}$. At the next control period, NO route is taken at step S10 in FIG. 3 and at step S45 in FIG. 3 and the routine goes to a step S90. The flowchart at the second phase in (c) of FIG. 4 is carried out.

At step Z10, control unit 10 again detects engine revolution speed NE and torque converter output revolution speed $NT_{OUT}$. At step Z20, control unit 10 carries out the flag determination. In case where, at the previous period, the holding release command of the brake force has already been issued, the routine goes from step Z20 to step Z110 and only clutch pressure CP is controlled.

On the other hand, in case where the holding release command of the brake force is not yet issued, the determinations of step Z20 and step Z30 are passed and accelerator opening degree AP is detected at step Z50. Then, in case where, at step Z60, accelerator opening degree AP is determined to be equal to or larger than predetermined value D, the routine goes to a step Z40. At step Z40, gradient G of clutch pressure CP is modified to relatively large gradient $G_L$ and, at step Z90, the holding release command of the brake force is issued. In other words, in case where the accelerator pedal at the second phase has been depressed, the holding of the brake force is released at a time point at which accelerator opening degree AP becomes equal to or larger than predetermined value D and an increase quantity of clutch pressure CP controlled at step Z110 is increased.

In case where, at step Z60, accelerator opening degree AP is determined to be smaller than predetermined value D, the determination at step Z80 is again carried out via step Z70. When the engagement of clutch 32 is advanced and revolution ratio R before and after the torque converter becomes equal to or smaller than the predetermined value (ratio), the engagement state of clutch 32 has become the predetermined state. Hence, the routine goes to step Z90 and, at step Z90, the holding release command of the brake force is issued. In other words, in case where accelerator opening degree AP does not become equal to or larger than predetermined value D until the engagement state of clutch 32 becomes the predetermined state, the holding of the brake force is released at a time point at which the engagement state of clutch 32 becomes the predetermined state.

In case where the input and output revolutions of clutch 32 are synchronized at the determination of step S100 in FIG. 3, the routine goes to a step S110. At step S110, clutch pressure CP is controlled to a final pressure $P_F$. Then, at the next step Z120, flag F is reset to F=0. Flag $BK_{OFF}$ is also reset to $BK_{OFF}$=0. Then, this flowchart of FIG. 3 is ended.

[4. Action]

Next, using (a) of FIG. 5 through (e) of FIG. 5 and (a) of FIG. 6 through (e) of FIG. 6, the hydraulic pressure control and the brake release control will be explained in case where the start condition is established during the automatic stop of engine 1.

First, as shown in (a) through (e) of FIG. 5, control contents in case where the accelerator pedal is depressed at the initial phase and accelerator opening degree AP becomes equal to or larger than predetermined value D will be explained.

The cranking of engine 1 is started from time $t_0$ at which brake switch 24 is changed from an on state to an off state and the start condition is established. Thus, operation of oil pump 5 is started. Hence, at the initial phase, clutch pressure CP is controlled to initial hydraulic pressure $P_0$. At time $t_1$ at which engine revolution speed NE becomes equal to or larger than threshold value speed $Ne_0$, engine 1 is determined to be completely exploded. From the time point at which engine 1 is determined to be completely exploded, the control phase by hydraulic pressure control section 12 is switched from the initial phase to the first phase.

It should, herein, be noted that, as shown in (b) of FIG. 5, in case where accelerator opening degree AP becomes equal to or larger than predetermined value D, during a time $t_{10}$ between a time point $t_0$ at which the re-start of engine 1 is started and a time point $t_1$ at which engine 1 has completely exploded, first hydraulic pressure $P_1$ and first time $T_1$ are obtained in accordance with accelerator opening degree (namely, the initial accelerator opening degree) $AP_0$ at the initial phase. In the example shown in (b) of FIG. 5, the accelerator pedal is gradually depressed, accelerator opening degree AP becomes equal to or larger than predetermined value D at time $t_{10}$, and, then, accelerator opening degree AP provides a constant value at an opening degree larger than predetermined value D. Therefore, in this case, the constant opening degree is stored as initial accelerator opening degree $AP_0$ and first hydraulic pressure $P_1$ and first time $T_1$ are obtained on a basis of this opening degree. It should be noted that, in case where accelerator opening degree AP is equal to or larger than predetermined value D and is not constant as shown in (b) of FIG. 5, accelerator opening degree AP immediately before the complete explosion is stored as initial accelerator opening degree $AP_o$.

As shown in (c) and (d) of FIG. 5, at the first phase, clutch pressure CP is controlled to first hydraulic pressure $P_1$ while obtained first time $T_1$ has elapsed and the first phase is transferred to the second phase at time $t_2$ at which first time $T_1$ has elapsed. This time $t_2$ provides the engagement start time point.

At the second phase, hydraulic pressure control section 12 gradually increases clutch pressure CP at predetermined gradient $G_L$ to advance the engagement of clutch 32. Then, at time $t_3$, the input and output revolutions of clutch 32 are synchronized. In other words, time $t_3$ provides the synchronization time point. At an end phase after time $t_3$, clutch pressure CP is controlled to final pressure $P_F$ and the engagement of clutch 32 is completed.

Release control section 14 holds the brake force until engagement start time point $t_2$ and issues the holding release command to brake device 6 at engagement start time point $t_2$ to release the holding of the brake force.

Thus, as shown in (e) of FIG. 5, the brake force is started to be reduced at constant gradient K and the brake force becomes zero at time $t_4$. In other words, in case where accelerator opening degree AP becomes equal to or larger than predetermined value D before engagement start time point $t_2$ of clutch 32, the holding of the brake force is released at engagement start time point $t_2$ of clutch 32. Thus, in case where the driver has the vehicular start intention, a higher priority is taken for a response of the accelerator operation and the startability of the vehicle is secured. In addition, even if the engagement shock is generated at the proximity of the revolution synchronization of clutch 32, as shown in (c) of FIG. 5, a shock felt by the driver is reduced since the vehicle is already started.

Next, as shown in (a) through (e) of FIG. 6, the control contents in case where the operation of the accelerator pedal is absent and accelerator opening degree AP is smaller than predetermined value D will be described. In the same way as (a) of FIG. 5, when the start condition is established at time $t_0$, the cranking of engine 1 is started. Clutch pressure CP is controlled to initial hydraulic pressure $P_0$ at the initial phase. Engine 1 is determined to be completely exploded at time $t_1$ at which engine revolution speed NE becomes equal to or larger than threshold speed $Ne_0$. From this time point, the control phase by means of hydraulic pressure control section 12 is switched from the initial phase to the first phase.

Since, in this case, as shown in (b) of FIG. 6, accelerator opening degree AP remains smaller than predetermined value D, as shown in (d) of FIG. 6, clutch pressure CP is controlled to first hydraulic pressure $P_1$ which is lower than first hydraulic pressure $P_1$ of (d) of FIG. 5 during first time $T_1$ which is longer than first time $T_1$ of (d) of FIG. 5. Then, as shown in (c) and (d) of FIG. 6, the first phase is transferred to the second phase at time $t_5$ at which first time $T_1$ has elapsed. Then, this time $t_5$ provides the engagement start time point. At the second phase, clutch pressure CP is gradually increased at predetermined gradient $G_S$ by hydraulic pressure control section 12 to advance the engagement of clutch 32. It should be noted that, at this time point $t_5$, the holding release command of the brake force is not yet issued.

Release control section 14 issues the holding release command to brake device 6 at time $t_6$ at which revolution ratio R before and after the torque converter becomes equal to or smaller than the predetermined ratio and the engagement state of clutch 32 becomes the predetermined state. Thus, as shown in (e) of FIG. 6, the brake force is started to be reduced at constant gradient K and the brake force becomes zero at a time $t_8$. Then, at a time $t_7$ from a time at which the brake force is started to be reduced to a time at which the brake force becomes zero (a time duration between time $t_6$ and time $t_8$), the input and output revolutions are synchronized. In the proximity of this synchronization time point $t_7$, an engagement shock due to the synchronization of the input and output revolutions of clutch 32 could be generated. However, since, in the proximity of time $t_7$, the brake force is left present, the shock transmitted to the driver is reduced. In other words, in case where the driver has no vehicular start intention (or the intention of the vehicular start by the driver is weak), the higher priority for the reduction of shock is taken than the startability of the vehicle.

[5. Effect]

(1) According to the above-described vehicular control apparatus, in case where the operation of the accelerator pedal is absent, namely, when the vehicular start intention of the driver is weak, the brake force is released in a state in which the engagement state of clutch 32 is high (the engagement force of clutch 32 is strong) as compared with a case where the start intention of the vehicle by the driver is strong. In other words, when the vehicular start intention is weak, the holding of the brake force is released at least from a time at which clutch 32 starts the engagement. Thus, the engagement shock which could be generated when the engagement of clutch 32 is started or in the proximity of the revolutions synchronization can be covered by the brake force and the shock transmitted to the vehicular occupant during the re-start of engine 1 can be suppressed.

On the other hand, when the vehicular start intention by the driver is strong, the holding of the brake force is released at an earlier timing than a case where the start intention by the driver is weak. Hence, the startability can be improved. Therefore, according to the above-described control unit 10, even if the engagement of clutch 32 is released during the automatic stop of engine 1, namely, the electrically driven oil pump to maintain the engagement is omitted, the compatibility between the suppression of the engagement shock of clutch 32 and the security of the startability can be established. In addition, since the electrically driven oil pump can be omitted, the cost can be reduced.

(2) According to the above-described vehicular control apparatus, in case where the operation of the accelerator pedal is present until the engagement state of clutch 32 becomes the predetermined state, during the re-start of engine 1, the holding of the brake force is released in a state in which the engagement force of clutch 32 is generated. In other words, since the brake force is held until the engagement start time point of clutch 32 (until the generation of the engagement force), in case where the vehicle is stopped on an ascending (or descending) slope, a slide down of the vehicle due to a vehicle's own weight can be suppressed and a reliability of the vehicle can be improved.

(3) According to the above-described vehicular control apparatus, in case where the operation of the accelerator pedal is present in a state in which the engagement force of clutch 32 is not generated, the holding of the brake force is released at a time point at which the engagement force of clutch 32 is generated. Thus, the slide down of the vehicle can be suppressed and the vehicle can more quickly be started during the re-start of engine 1 at which the vehicular start intention by the driver is strong.

(4) According to the above-described vehicular control apparatus, in case where the operation of the accelerator pedal is present until the engagement state of clutch 32 becomes the predetermined state, during the re-start of engine 1, clutch pressure CP is made higher pressure than a case where the operation of the accelerator pedal is absent. Thus, a time duration at which clutch 32 is engaged can be shortened. Thus, the startability of the vehicle can more be improved.

(5) Furthermore, according to the above-described vehicular control apparatus, as the depression quantity of the accelerator pedal becomes larger, clutch pressure CP is made higher (a pressure increase correction is made). Hence, as accelerator opening degree AP becomes larger, the time duration during which clutch 32 is engaged can be shortened and the startability of the vehicle can furthermore be improved.

(6) In addition, in the above-described vehicular control apparatus, determination section 13 determines the engagement state of clutch 32 on a basis of engine revolution speed NE and torque converter output revolution speed $NT_{out}$. Engine revolution speed NE is a usually detected revolution speed in spite of the above-described hydraulic pressure control and the brake release control. In other words, determination section 13 determines the engagement state of clutch 32 by using engine revolution speed NE which is an existing sensor value. Thus, it becomes unnecessary to directly detect the input and output revolutions of clutch 32, an increase of a number of equipments is suppressed and the cost can accordingly be reduced.

(7) It should be noted that, in case where, in this embodiment, the operation of the accelerator pedal is absent until the engagement state of clutch 32 becomes the predetermined state, the brake force is reduced at constant gradient K at a time point at which the engagement state becomes the predetermined state and the brake force is left present at the revolution synchronization time point of clutch 32. Thus, the brake force is assuredly left in the proximity of the revolution synchronization of clutch 32 and the transmission of engagement shock of clutch 32 to the vehicular occupant can be suppressed.

[6. Others]

Hereinabove, the preferred embodiment according to the present invention has been explained. The present invention is not limited to the above-described embodiment. Various modifications can be made without departing from the gist of the present invention.

For example, in case where the operation of the accelerator pedal is present during the re-start of engine 1, a timing at which the holding of the brake force is released is not limited to the above-described embodiment. In the above-described embodiment, release control section 14 issues the holding release command of the brake force at the engagement start time point, in case where accelerator opening degree AP becomes equal to or larger than predetermined value D at the initial phase or at the first phase (namely, until the engagement start) so that the slide down of the vehicle is prevented. However, for example, in case where a gradient of a road surface on which the vehicle is stopped is detected and the vehicle is stopped on a flat road surface, the holding release command may be issued at an earlier timing than the engagement start time point. Thus, the startability of the vehicle can more be improved.

In addition, in case where the operation of the accelerator pedal is present while the engagement state becomes the predetermined state from the engagement start of clutch 32, the holding of the brake force is released at a time point at which the operation of the accelerator pedal is present (a time point at which AP so as to secure the startability. However, the brake force may be released in a state in which at least the engagement force of clutch 32 is generated. In other words, during the re-start of engine 1, in case where the operation of the accelerator pedal is present until the engagement state of clutch 32 becomes the predetermined state, the holding of the brake force may be released when the engagement state of clutch 32 is the engagement state weaker than the predetermined state (a state in which at least the engagement force of clutch 32 is generated).

In addition, in the above-described embodiment, a case where the predetermined state is set at the latter half of the engagement of clutch 32 has been explained. However, the predetermined state is not limited to this. The predetermined state may be a state in which at least the engagement force of clutch 32 is generated (namely, a state after the engagement of clutch 32 is started).

In addition, release control section 14 does not gradually reduce the brake force but may reduce the brake force in a stepwise manner, in case where the holding release command of the brake force is issued when accelerator opening degree AP is equal to or larger than predetermined value.

In addition, the determination method of the engagement state of clutch 32 by determination section 13 is not limited to the above-described embodiment. For example, the engagement state of clutch 32 may be determined on a basis of clutch input revolution speed $NC_{in}$ and clutch output revolution speed $NC_{out}$. As shown in (c) of FIG. 6, while clutch input revolution speed $NC_{in}$ (torque converter output revolution speed $NT_{out}$) is raised after the complete explosion of engine 1 during the release of clutch 32 at the time of the re-start of engine 1, clutch output revolution speed $NC_{out}$ remains zero and does not change. When the engagement of clutch 32 is started, the revolution of input shaft 30a is dragged with the revolution of output shaft 30b. Hence, clutch input revolution speed $NC_{in}$ is started to be reduced. Then, when clutch 32 is synchronized, both of clutch input revolution speed $NC_{in}$ and clutch output revolution speed $NC_{out}$ becomes coincident with each other.

Therefore, determination section 13 may determine the engagement state (the engagement force) of clutch 32 from, for example, the ratio of clutch input revolution speed $NC_{in}$ with respect to clutch output revolution speed $NC_{out}$ (clutch input output revolution ratio). In this way, if input and output revolutions $NC_{in}$ and $NC_{out}$ of clutch 32 are directly detected, the engagement state of clutch 32 can more assuredly be determined. As other alternatives, for example, when only clutch input revolution speed $NC_{in}$ is detected and clutch input revolution speed $NC_{in}$ becomes below a predetermined revolution speed, the determination section may determine that the engagement state of clutch 32 become the predetermined state or may determine using an elapsed time from the engagement start time point.

In addition, in the above-described embodiment, the time point at which first time $T_1$ has elapsed from the time at which the complete explosion of engine 1 is made is the engagement start time point of clutch 32. However, in place of first time $T_1$, clutch input revolution speed $NC_{in}$ may be monitored to determine whether the engagement of clutch 32 is started. When the engagement of clutch 32 is started, clutch 32 is started to have the capacity. Hence, as shown in (c) of FIG. 5 and (c) of FIG. 6, clutch input revolution speed $NC_{in}$ is started to be reduced. Therefore, at a time point at which a variation percentage of clutch input revolution speed $NC_{in}$ becomes zero or at a time point at which the variation percentage is changed from a positive value to a negative value, a determination that the engagement of clutch 32 is started may be made.

It should be noted that brake device 6 is not limited to the above-described structure but may at least have a function to hold the brake force for the vehicle during the stop of engine 1. For example, brake device 6 may be structured in such a way as to modify the gradient of reducing the brake force in accordance with the command from release control section 14. It should be noted that, in the above-described embodiment, the operation of brake pedal 61 is detected by brake switch 24. However, a determination of whether brake pedal 61 is depressed may be made by a detection of a brake liquid pressure.

In addition, the control contents of clutch pressure CP by hydraulic pressure control section 12 are not limited to the above-described embodiment. For example, in case where, in place of first time $T_1$, clutch input revolution speed $NC_{in}$ is monitored to determine whether clutch 32 has started the engagement, first hydraulic pressure $P_1$ may be feedback controlled by checking the variation percentage or the variation quantity of clutch input revolution speed $NC_{in}$. In addition, in place of setting predetermined gradient G at the second phase, clutch input revolution speed $NC_{in}$ may be monitored and second hydraulic pressure $P_2$ may be controlled in a feedback control mode, or gradient G may be given as the function of accelerator opening degree AP. It should be noted that, even if the accelerator pedal is depressed during the time duration from the time at which the complete explosion of engine 1 is made to the engagement start time point, first hydraulic pressure $P_1$ may be held constant.

Each of the stop condition of engine 1 and the start condition of engine 1 is merely one example and is not limited to the above-described embodiment. In the stop condition of engine 1, at least a situation such that brake pedal 61 has been depressed, namely, the above-described (B) may be included. In addition, above-described predetermined value D may be set to zero and the accelerator on and the accelerator off may merely be determined from presence or absence of the operation of the accelerator pedal.

In addition, in the above-described embodiment, automatic transmission 2 constituted by torque converter 20, forward-reverse switching mechanism 30, CVT 40, and gear pair 50 is exemplified. However, the automatic transmission is not limited to this. For example, the automatic transmission in which, in place of forward-reverse switching mechanism 30, a transmission mechanism (so-called, a sub transmission mechanism) constituted by a plurality of stages of forward movement purpose frictional engagement means and reverse movement purpose frictional engagement means are connected to secondary shaft 40b of CVT 40 may be adopted. In addition, a multi-stage type automatic transmission may be adopted in place of CVT 40. In other words, the forward frictional engagement means is not limited to above-described clutch 32.

The invention claimed is:

1. A vehicular control apparatus, comprising:
an automatic transmission which separates an engine and a driving wheel during a stop of the engine and in which frictional engagement means which engages during a start of the engine is equipped;
brake holding means for holding a brake force produced through a depressed brake pedal during the stop of the engine;
engine control means for performing an automatic stop of the engine when a predetermined stop condition including a situation such that the brake pedal has been depressed is established and for re-starting the engine when a predetermined start condition is established during the automatic stop; and
release control means for releasing a holding of the brake force of the brake holding means when a predetermined release condition including another situation such that a depression of the brake pedal has become weakened is established,
wherein, during a re-start of the engine through the engine control means, in case where an operation of an accelerator pedal is absent until an engagement state of the frictional engagement means becomes a predetermined state, the release control means releases the holding of the brake force when the engagement state of the frictional engagement means is the predetermined state and, in case where the operation of the accelerator pedal is present until the engagement state of the frictional engagement means becomes the predetermined state, the release control means releases the holding of the brake force when the engagement state of the frictional engagement means is an engagement state weaker than the predetermined state.

2. The vehicular control apparatus as claimed in claim 1, wherein the release control means releases the holding of the brake force in a state in which an engagement force of the frictional engagement means is generated, in case where the operation of the accelerator pedal is present.

3. The vehicular control apparatus as claimed in claim 1, wherein the release control means releases the holding of the brake force at a time point at which an engagement force of the frictional engagement means is generated, in case where the operation of the accelerator pedal is present in a state in which the engagement force of the frictional engagement means is not generated.

4. The vehicular control apparatus as claimed in claim 1, wherein the vehicular control apparatus further comprises hydraulic pressure control means for controlling a hydraulic pressure supplied to the frictional engagement means and the hydraulic pressure control means makes the hydraulic pressure higher than a case where the operation of the accelerator pedal is absent, in case where the operation of the accelerator pedal is present until the engagement state of the frictional engagement means becomes the predetermined state, during the re-start of the engine.

5. The vehicular control apparatus as claimed in claim 4, wherein the hydraulic pressure control means makes the hydraulic pressure higher as a depression quantity of the accelerator pedal becomes larger.

6. The vehicular control apparatus as claimed in claim 1, wherein the automatic transmission is provided with a torque converter to which an output shaft of the engine is connected and the vehicular control apparatus further comprises:
  engine revolution speed detecting means for detecting an engine revolution speed which is a revolution speed of the output shaft of the engine;
  torque converter output revolution speed detecting means for detecting a torque converter output revolution speed which is a revolution speed of an output shaft of the torque converter; and
  determination means for determining the engagement state of the frictional engagement means on a basis of the engine revolution speed and the torque converter output revolution speed.

7. The vehicular control apparatus as claimed in claim 1, wherein the vehicular control apparatus further comprises:
  clutch input revolution speed detecting means for detecting a clutch input revolution speed which is a revolution speed of an input shaft of the frictional engagement means;
  clutch output revolution speed detecting means for detecting a clutch output revolution speed which is a revolution speed of an output shaft of the frictional engagement means; and
  determination means for determining the engagement state of the frictional engagement means on a basis of the clutch input revolution speed and the clutch output revolution speed.

* * * * *